United States Patent
Schuetzle et al.

(10) Patent No.: US 11,965,134 B2
(45) Date of Patent: Apr. 23, 2024

(54) PRODUCTION OF SUSTAINABLE AVIATION FUEL FROM $CO_2$ AND LOW-CARBON HYDROGEN

(71) Applicant: INFINIUM TECHNOLOGY, LLC, Sacramento, CA (US)

(72) Inventors: Dennis Schuetzle, Grass Valley, CA (US); Robert Schuetzle, Sacramento, CA (US); James Bucher, Boston, MA (US); Matthew Caldwell, West Sacramento, CA (US); Anja Rumplecker Galloway, San Rafael, CA (US); Orion Hanbury, Sacramento, CA (US); Glenn McGinnis, Sun Lakes, AZ (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

(21) Appl. No.: 17/803,076

(22) Filed: Feb. 2, 2022

(65) Prior Publication Data
US 2023/0242822 A1 Aug. 3, 2023

(51) Int. Cl.
*C10G 2/00* (2006.01)
*C10G 45/64* (2006.01)
(Continued)

(52) U.S. Cl.
CPC .............. *C10G 2/30* (2013.01); *C10G 45/64* (2013.01); *C10G 47/02* (2013.01); *C10G 47/12* (2013.01); *C10G 50/00* (2013.01); *C10G 65/12* (2013.01); *C10G 69/126* (2013.01); *C10K 3/026* (2013.01); *C10L 1/04* (2013.01); *C25B 1/04* (2013.01); *C10G 2300/301* (2013.01);
(Continued)

(58) Field of Classification Search
CPC .......... C10G 2/30; C10G 45/64; C10G 47/02; C10G 47/12; C10G 50/00; C10G 65/12; C10G 69/126; C10G 2300/301; C10G 2400/08; C10G 2/32; C10K 3/026; C10L 1/04; C10L 2200/043; C25B 1/04
See application file for complete search history.

(56) References Cited

U.S. PATENT DOCUMENTS

2012/0209037 A1 8/2012 Viljoen et al.
2021/0340015 A1* 11/2021 Schuetzle ................ C01B 5/00
(Continued)

OTHER PUBLICATIONS

Lokesh et al. "Life cycle greenhouse gas analysis of biojet fuels with a technical investigation into their impact on jet engine performance", Biomass and Bioenergy 77 (2015) 26-44.
(Continued)

*Primary Examiner* — Ellen M McAvoy
(74) *Attorney, Agent, or Firm* — Jeffrey A. McKinney; McKinney Law Group APC

(57) ABSTRACT

A process for the production of sustainable aviation fuel (SAF) with low carbon intensity. The jet fuel is produced from the reaction of hydrogen from the electrolysis of water with captured carbon dioxide. The hydrogen and carbon dioxide are reacted to product a stream comprising carbon monoxide. Hydrogen and carbon monoxide are reacted to produce n-alkanes. Alkanes are hydroisomerized to produce sustainable aviation fuel with low carbon intensity.

11 Claims, 3 Drawing Sheets

(51) Int. Cl.
    *C10G 47/02*     (2006.01)
    *C10G 47/12*     (2006.01)
    *C10G 50/00*     (2006.01)
    *C10G 65/12*     (2006.01)
    *C10G 69/12*     (2006.01)
    *C10K 3/02*     (2006.01)
    *C10L 1/04*     (2006.01)
    *C25B 1/04*     (2021.01)

(52) U.S. Cl.
    CPC . *C10G 2300/302* (2013.01); *C10G 2300/304* (2013.01); *C10G 2300/305* (2013.01); *C10G 2300/307* (2013.01); *C10G 2300/308* (2013.01); *C10G 2400/08* (2013.01); *C10L 2200/043* (2013.01)

(56) References Cited

U.S. PATENT DOCUMENTS

| | | | |
|---|---|---|---|
| 2021/0340077 A1* | 11/2021 | Schuetzle | C01B 3/40 |
| 2022/0064541 A1* | 3/2022 | Lyubovsky | B01D 3/007 |
| 2022/0081289 A1* | 3/2022 | De Sarkar | C10K 3/026 |
| 2022/0251455 A1* | 8/2022 | Schuetzle | B01J 21/005 |
| 2022/0315508 A1* | 10/2022 | Hanks | B01J 31/2278 |
| 2022/0333015 A1* | 10/2022 | McGinnis | B01D 53/04 |
| 2022/0348472 A1* | 11/2022 | Schuetzle | B01J 23/80 |
| 2022/0410109 A1* | 12/2022 | Mortensen | B01J 19/1812 |
| 2023/0108520 A1* | 4/2023 | Agee | C10G 67/02 |
| | | | 208/93 |
| 2023/0150823 A1* | 5/2023 | Schuetzle | B01J 35/10 |
| | | | 423/418.2 |
| 2023/0173445 A1* | 6/2023 | Schuetzle | C01B 3/06 |
| | | | 422/221 |
| 2023/0356177 A1* | 11/2023 | De Sarkar | C01B 3/382 |

OTHER PUBLICATIONS

Li et al. "Life cycle assessment of camelina oil derived biodiesel and jet fuel in the Canadian Prairies", Science of the Total Environment 481 (2014) 17-26.

ASTM D7566-21, "Standard specification for aviation turbine fuel containing synthesized hydrocarbons," Specification issued Jul. 1, 2021.

De Klerk, Arno, "Aviation turbine fuels through the Fischer-Tropsch Process," Biofuels for Aviation, Ch. 10 (2016).

Meurer, A., "Fischer-Tropsch synthesis as the key for decentralized . . . ," Energies, vol. 14, p. 1836 (2021).

\* cited by examiner

PRODUCTION OF SUSTAINABLE AVIATION
FUEL FROM $CO_2$ AND LOW-CARBON
HYDROGEN

FIELD OF THE INVENTION

The field of the invention is a process to produce synthetic jet fuel, jet fuel components, or synthetic paraffinic kerosene from low carbon hydrogen and captured $CO_2$.

BACKGROUND OF THE INVENTION

The increase in global atmospheric carbon dioxide concentrations has been linked to changes in the earth's climate. The combustion of fossil fuels in various engines produces atmospheric carbon dioxide. Concerns about climate change have led to significant societal changes toward renewable or low carbon electricity. This has also led to increasing activity to decarbonize the transport sector of the economy. As a result, we see increases in the use of electric vehicles that are powered by renewable electricity to aid in decarbonization of the transport sector. Aviation is one of the most carbon intensive transportation sectors. Yet aviation accounts to more than two percent of global carbon dioxide emissions. The consumption of jet fuel produced from petroleum, a fossil fuel, by the aviation sector is a significant fraction of the total transport carbon dioxide emissions. However, sustainable aviation fuel (SAF) is currently significantly more expensive than fossil fuel based jet fuel. Jet aircraft are unlikely to be electrified in the near future. Efficient and economical production SAF could lead to significant reductions in the carbon dioxide emissions by the aviation sector.

Jet engines are complex technological devices that have been optimized over 70 years to operate on petroleum derived jet fuel. Global standards have been developed regarding the properties of jet fuel. ASTM D1655 is the U.S. standard for petroleum derived jet fuel. Starting in 2009, another standard has been developed for jet fuel or jet fuel components that are not derived from petroleum. ASTM D7566-21 (Reference 1) is the current standard specification for aviation turbine fuel containing synthesized hydrocarbons (not from petroleum). The catalytic hydrogenation of carbon monoxide to produce light gases, liquids, and waxes, ranging from methane to heavy hydrocarbons (C100 and higher) in addition to oxygenated hydrocarbons, is typically referred to FischerTropsch (or F-T) synthesis. One of the routes for production of non-petroleum based synthesized paraffinic kerosene (SPK) allowed by ASTM D7566 is the fuel derived from the Fischer-Tropsch process. Traditional low temperature (<250° C.) F-T processes primarily produce a high weight (or wt. %) F-T wax ($C_{24}$ and higher) from the catalytic conversion process. These F-T waxes are then hydrocracked and/or further processed to produce diesel, naphtha, and other fractions. During this hydrocracking process, light hydrocarbons are also produced. In some embodiments, these light hydrocarbons require additional upgrading to produce viable products. The catalysts that are commonly used for F-T are either Cobalt (Co) based, or Iron (Fe) based catalysts.

There are many routes to produce SPK from F-T products and they have been detailed in various publications including de Klerk (Reference 2). de Klerk deals with hydrogenation of F-T Straight run kerosene to make SPK but the inherently high n-alkane content of the hydrotreated straight run F-T products will limit the amount of such kerosene that is blended in semi-synthetic jet fuel. This invention overcomes this issue and concentrates on the "straight run kerosene" but via hydroisomerization, thereby overcoming the issues of blending straight run F-T kerosene into the SPK. The hydroisomerization converts the n-alkanes to iso-paraffins. In another part of de Klerk, FIG. 10.3 shows a route involving an oligomerization of $C_3$-$C_5$ feed from an FT reactor. The oligomerization reactor makes a $C_5$ and heavier product that is hydrotreated to make isoparaffinic kerosene. The invention of the application has an embodiment that includes an oligomerization step, but the enclosed invention has an oligomerization feed for a $C_5$-$C_9$ hydrocarbon stream that results in a kerosene stream.

Hydrocracking to produce jet fuel/SPK is dealt with in FIG. 10.4 of de Klerk. The F-T wax ($C_{24}$+) is the major product from low-temperature F-T synthesis that de Klerk covers. The wax is hydrocracked to produce a kerosene fraction that is put into SPK. This is not the case for this invention. The primary liquid products of this invention are the $C_9$-$C_{15}$ Liquid Fuel Production reactor product that is converted to SPK. The use of the hydrocracker in this invention is to convert primarily the $C_{16}$-$C_{24}$ material.

Meurer and Kern (Reference 3) deals with the production of synthetic paraffinic kerosene from a power to liquids facility. It shows a process configuration that uses renewable electricity to produce hydrogen and show that a RWGS reactor converts $CO_2$ to CO that is used in an F-T reactor and processed to make kerosene that is used as jet fuel. However, there are significant differences. The F-T process in the Meurer reference is different than the disclosed LFP technology. The Meurer F-T system under any of the cases disclosed, never shows a kerosene selectivity of greater than 40%. The process of the invention has a higher kerosene selectivity of between 50% and 100%.

The current invention is a process to produce synthesized paraffinic kerosine (SPK) blendstock that is used as a sustainable aviation fuel from low carbon hydrogen and captured $CO_2$.

BRIEF SUMMARY OF THE INVENTION

This invention is a process to produce synthesized paraffinic kerosene that is used as jet fuel. Renewable or low carbon electricity is used to convert water to hydrogen and oxygen in an electrolyzer. Carbon dioxide is reacted with at least a portion of the hydrogen to produce a stream comprising carbon monoxide with a carbon dioxide conversion per pass of between 50% to 100%, preferably between 60% and 100%, and more preferably between 70% and 100%.

At least a portion of the carbon monoxide produced is reacted with hydrogen in a Liquid Fuel Production (LFP) reactor to produce a liquid product that comprises n-alkanes with carbon numbers from 5 to 24. The $C_9$ to $C_{15}$ fraction of the liquid product is between 40% and 100%, preferably between 45% and 100%, and more preferably between 50% and 100%. The LFP liquid product is further separated into three liquid streams in an LFP separation unit. The light LFP separation product stream comprises $C_5$ to $C_8$ n-alkanes; the medium LFP separation product stream comprises $C_9$-$C_{15}$ n-alkanes; the heavy LFP separation product stream comprises $C_{16}$-$C_{24}$ n-alkanes.

At least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is between −40° C. to −60° C. In one embodiment the freeze point is between −48° C. and −60° C. In one embodiment the freeze point is between −48° C. and −55° C. In some embodiments, the heavy hydroisomerization product is a synthesized paraffinic kerosene (SPK) that is used a component in jet fuel.

In some embodiments of the invention, at least a portion of the light LFP separation unit product stream is fed to an oligomerization reactor to produce an oligomerization reactor product that comprises hydrocarbons with a carbon number from 9 to 15.

In some embodiments of the invention, wherein at least a portion of the oligomerization reactor product is fed to the LFP separation unit.

In some embodiments of the invention, wherein at least a portion of the heavy LFP separation unit product is fed to a hydrocracker reactor to produce hydrocracker product stream wherein the hydrocracker product stream is fed to a hydrocracker product separation unit to produce at least two hydrocracker product streams wherein the light hydrocracker product stream wherein the heavy hydrocracker product stream comprises hydrocarbons with carbon numbers from 9 to 15.

In some embodiments of the invention, the carbon intensity (CI) of the produced SAF is between 0 and 50, preferably between 0% and 20%, and more preferably between 0% and 10%. Where negative carbon hydrogen is used in the production of the SAF that is produced from biomass, renewable natural gas or other renewable feedstocks, the CI of the produced sustainable aviation fuel is negative.

DETAILED DESCRIPTION OF THE INVENTION

Figure 1:
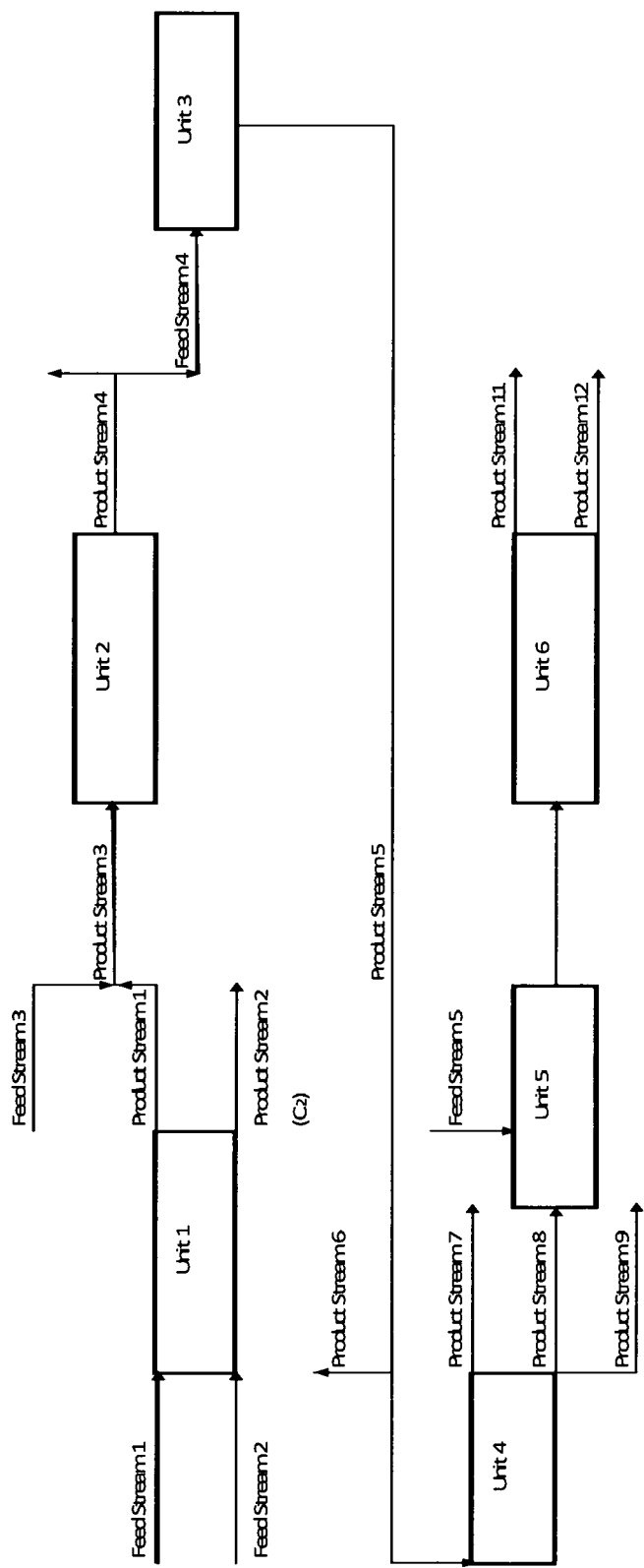
FIG. 1 is a process to produce synthesized paraffinic kerosene through the use of a hydroisomerization reactor.

FIG. 1 shows an integrated process for the production of synthesized paraffinic kerosene. Feed stream 1 is low carbon electricity. Low carbon power includes but is not limited to wind power, solar power nuclear power, power generated from biomass or renewable natural gas, and hydropower. Feed stream 2 is water. These are fed to Unit 1 which is the electrolyzer. In the electrolyzer, water and low carbon energy are used to produce hydrogen and oxygen. Water is fed to the electrolyzer. The electrolyzer is powered by low carbon electricity. Hydrogen is produced by electrolysis of water.

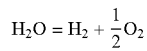

Electrolyzers consist of an anode and a cathode separated by an electrolyte. Different electrolyzers function in slightly different ways. Different electrolyzer designs that use different electrolysis technology that are used include alkaline electrolysis, polymer electrolyte membrane (PEM) electrolysis, solid oxide electrolysis, high temperature electrolysis and other emerging types of electrolysis. Different electrolytes that are used including liquids KOH and NaOH, and with or without activating compounds. Activating compounds are added to the electrolyte to improve the stability of the electrolyte. Most ionic activators for the hydrogen evolution reaction are composed of an ethylenediamine-based metal chloride complex ([M(en)3]Clx,M¼Co, Ni, et al.) and $Na_2MoO_4$ or $Na_2WO_4$. Different electrocatalysts are used on the electrodes including many different combinations of metals and oxides like Raney-Nickel-Aluminum, which are enhanced by adding cobalt or molybdenum to the alloy.

The products from the electrolyzer are a stream comprising hydrogen called product stream 1 and a stream comprising oxygen called product stream 2. Due to the use of renewable energy sources, the electrolyzer produces green hydrogen. Depending on the carbon-intensity of energy used in unit 1 other low carbon hydrogen streams are produced. Other forms of hydrogen generation that may use renewable or non-renewable energy sources may also be used, including methane pyrolysis, steam reforming with carbon capture, biomass gasification, renewable natural gas (RNG) reforming or sourcing hydrogen from geological sources where purification of the stream may be required to produce hydrogen for use in a process.

In FIG. 1, Feed stream 3 is a stream that comprises carbon dioxide. Carbon dioxide is obtained from several sources. Power plants that generate electricity from various carbonaceous resources produce large amounts of carbon dioxide. Industrial manufacturing plants that produce ammonia for fertilizer produce large amounts of carbon dioxide. Ethanol plants that convert corn or wheat into ethanol produce large amounts of carbon dioxide via fermentation. Other industrial fermentation processes also produce large amounts of carbon dioxide. Municipal sewage treatment systems using aerobic and anaerobic digestion of sludge produce large amounts of $CO_2$. Utilization or conversion of $CO_2$, as described herein, typically involves separating and purifying the $CO_2$ from a gaseous stream where the $CO_2$ is not the major component (e.g., exhaust flue gas). Typically, an alkylamine is used to remove the carbon dioxide from the gas stream. Alkylamines used in the process include monoethanolamine, diethanolamine, methydiethanolamine, disopropylamine, aminoethoxyethnol, or combinations thereof. Metal Organic Framework (MOF) materials have also been used as a means of separating carbon dioxide from a dilute stream using chemisorption or physisorption to capture the carbon dioxide from the stream. Other methods to get concentrated carbon dioxide include chemical looping combustion where a circulating metal oxide material captures the carbon dioxide produced during the combustion process. Carbon dioxide is also be captured from the atmosphere in what is called direct air capture (DAC). The processes for the capture of carbon dioxide often involve regeneration of the capture materials. Alkylamines are regenerated by being heated, typically by low pressure steam.

Captured carbon dioxide which is converted into useful products such as fuels (e.g. diesel fuel, gasoline blend stocks, jet fuel, other) and chemicals (e.g. solvents, olefins, alcohols, aromatics, other), displace fuels and chemicals produced from fossil sources such as petroleum and natural gas, lower the total net emissions of carbon dioxide into the atmosphere. This is what is meant by low carbon, very low carbon, zero carbon, or negative carbon fuels and chemicals.

The carbon dioxide streams that comes from industrial or biological process, or is captured from the atmosphere, or that is available from a commercial carbon dioxide pipeline is not pure carbon dioxide. These available carbon dioxide streams from industrial facilities or pipelines contains sulfur containing compounds from none to 2000 parts per million by weight and also contain hydrocarbons from none to 10 volume percent. Purification of the carbon dioxide including the removal of sulfur containing compounds and hydrocarbons is necessary to avoid issues with downstream processing. After purification, the purified carbon dioxide is suitable for the generation of low carbon or zero-carbon fuels and chemicals.

At least a portion of the product stream 1 comprising hydrogen is blended with the feed stream 3 comprising carbon dioxide to produce a Reverse Water Gas Shift (RWGS) Reactor feed stream. Carbon dioxide and hydrogen are reacted to carbon monoxide and water in a Reverse Water Gas Shift (RWGS) reactor where the heat of reaction is provided by a RWGS Heater. The catalyst used in the RWGS reactor is a catalyst as referenced in the published application U.S. Ser. No. 17/300,260.

At least a portion of Product stream 4 (RWGS Product stream) which comprises hydrogen and carbon monoxide becomes the Liquid Fuel Production (LFP) reactor feed. The RWGS Product, comprising carbon monoxide and with the possible addition of extra hydrogen, is reacted to fuels and chemicals in a Liquid Fuels Production (LFP) reactor that uses a catalyst to produce long chain hydrocarbons that are used as fuels and chemicals. The final product is a hydrocarbon mixture where the majority (e.g., 51 volume percent to 99 volume percent) of hydrocarbons in the mixture are hydrocarbons to 24 carbon atoms in length.

The LFP hydrocarbon product stream (Product Stream 5) comprises n-alkanes with carbon numbers from 5 to 24 that is fed to an LFP separation unit where at least three products are produced. "Carbon number" refers to the number of carbon atoms in the respective alkane. The LFP separation is any separation process absorption, adsorption, filtration, or distillation. Distillation is the preferred separation process. The LFP separation unit produces at least three products. The light LFP separation product comprises n-alkanes with carbon numbers between 5 and 8. The heavy LFP separation product comprises n-alkanes with carbon numbers between 16 and 24. The medium LFP separation product comprises n-alkanes from carbon numbers between 9 and 15. The medium LFP separation product is in the boiling range of synthesized paraffinic kerosene or jet fuel. However, as is seen in Example 1, the physical properties of the n-alkane rich medium LFP separation product do not meet the requirements of SPK jet fuel without additional processing.

In one embodiment of the invention, at least a portion of the heavy LFP separation unit product is sold as premium low sulfur, high cetane diesel fuel. "At least a portion of" means a part of the whole. Nonlimiting examples of "at least a portion" include 5%, 10%, 20%, 30%, 40%, 50%, 60%, 70%, 80%, 90% and 100%.

At least a portion of the medium LFP separation product is fed to Unit 5 or a hydroisomerization unit. In hydroisomerization, the properties of the feedstock are improved by transforming normal alkane hydrocarbons to branched ones having the same carbon numbers. This reaction improves the cold flow properties of the hydrocarbon. As shown in Example 1, the hydroisomerization reaction decreases the pour point or the freezing point of the hydrocarbon stream.

The hydroisomerization reactor is any suitable design but it is preferred that the reactor be a cylindrical reactor with a liquid feed at the top of the reactor. The liquid feed comprising the medium LFP separation product is mixed with Feed Stream 5 comprising hydrogen. The combined feed reacts over a catalyst bed in the reactor vessel. Typically, this reactor is a trickle bed reactor. At least a portion of the n-alkanes react across the catalyst to produce branched alkanes. The reactor is comprised of one or more catalyst beds. In some embodiments, additional hydrogen feed is injected between the various catalyst beds. The molar ratio of the hydrogen to liquid hydrocarbon feed ranges from 10 to 300, more preferably between 15 to 30, even more preferably from 19 to 25. The operating pressure of the hydroisomerization reactor is between 10 to 100 bar, more preferably between 20 and 80, and more preferably between 30 and 40. The Weight Hourly Space Velocity (WHSV) is between 0.1 to 10 kg/hr liquid feed/kg catalyst, more preferably between 0.2 and 5 $hr^{-1}$, and more preferably between 0.5 to 2 $hr^{-1}$. The reactor operating temperature from 200° C. to 350° C.

The hydroisomerization catalyst is a solid shaped particle. The catalyst comprises a metal deposited on an acidic support. The catalyst metal in some embodiments is a platinum and palladium that provides hydrogenation and dehydrogenation activity. The catalyst metal in some embodiments comprises nickel. The catalyst metal in some embodiments comprises copper. In some embodiments that catalyst metal comprises a bimetallic such as Ni—Cu, Ni—Mo, Pt—Fe, and Pt—Be. The acidic support is chosen from any suitable support and includes supports comprising ZSM-5, ZSM-22, ZSM-23, Silica, Alumina, $SiO_2$—$Al_2O_3$, Beta zeolite, MCM-41, MCM-48, SBA-15 and includes blends of such supports.

The conversion of n-alkane to branched alkane in the hydroisomerization reactor is preferably between 50 and 100%, and more preferably from 80 to 100%. The reactor temperature, pressure, hydrogen to n-alkane ratio, and weight hourly space velocity (WHSV) is manipulated to maintain a high conversion of n-alkane conversion to branched alkanes.

Figure 2:
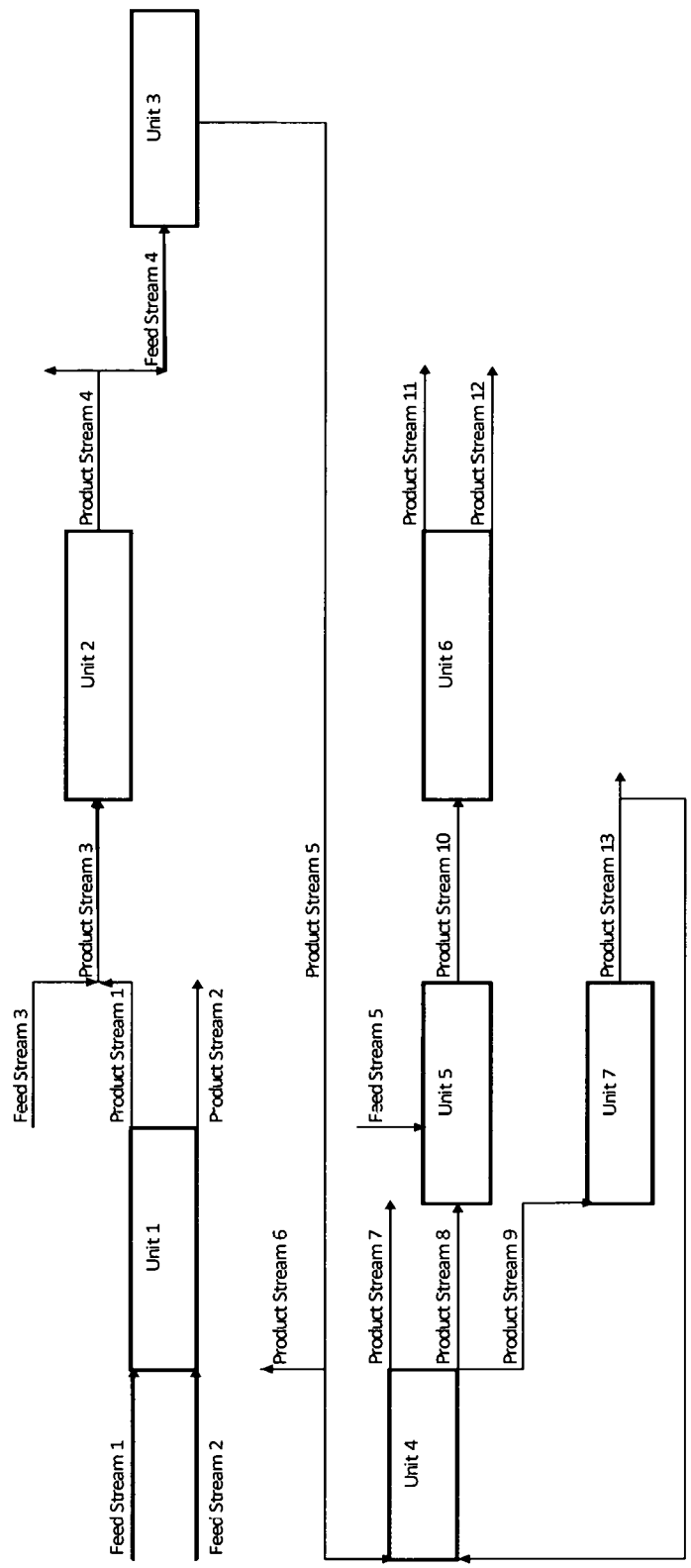
FIG. 2 is a process to produce synthesized paraffinic kerosene through the use of a oligomerization reactor.

FIG. 2 shows an optional embodiment of the invention. In some embodiments of the invention, a least a portion of the light LFP separation unit product (product stream 9) comprising a mixture of alkanes and alkenes is fed to an oligomerization reactor (Unit 7) to produce an oligomerization product (Product Stream 13). At least a portion of Product Stream 13 is fed back to the LFP Separation Unit (Unit 4).

The light LFP separation unit product comprises a mixture of n-alkanes and n-alkenes. The alkene/alkane ratio in the stream is controlled by changes in the LFP reactor operating conditions. Lower hydrogen to carbon monoxide ratios in the LFP reactor feed and higher LFP reactor temperature favors the production of n-alkenes over n-alkanes. The alkenes are reacted with each other and produce a product that is in the kerosene boiling range.

Oligomerization refers to one or more consecutive addition reactions between alkenes. Alkene addition is collectively referred to as oligomerization unless it is important to indicate a specific multiple of the addition reaction. It is a catch-all term that includes dimerization (addition reaction of two alkenes), trimerization, tetramerization, and higher multiples of addition reactions.

The oligomerization reactor (Unit 7) is a fixed bed reactor filled with catalyst. The reactor operates at a temperature of 100° C. to 300° C. at a pressure of 8 to 70 bar. A wide range of different catalyst are used to oligomerize the n-alkenes in the oligomerization reactor. These catalysts include $SO_4^{2-}$/$ZrO_2$, H-ZSM-5, H—Y, Cr/H-ZSM-5, Cr/H—Y, Cr/H-MCM-41, Solid Phosphoric Acid (SPA), metal promoted SPA catalyst, Fe/NiO/SPA, amorphous $SiO_2$—$Al_2O_3$, H-ZSM-22, H-ZSM-57, Cr/SO2, $H_3PO_4$/$SO_2$, and other commercial catalysts.

By the nature of the oligomerization reaction, the linear alkenes produced in the LFP reactor when oligomerized become primarily branched alkenes. These branched oligomers will primarily be dimers and trimers of the feed alkenes. The branched products are alkenes primarily but with certain metal promoted oligomerization catalysts, the alkenes produced by oligomerization are hydrogenated to alkanes in the oligomerization reactor.

Kerosene and diesel range material is produced by oligomerization. The distillate properties depend on the catalyst technology that is used. When ZSM-5-catalyzed oligomerization is employed, the branching in the distillate is limited and the hydrogenated distillate has a high cetane number and good cold-flow properties.

There are commercially available oligomerization technologies currently available that are used to convert the alkenes in the light LFP separation unit product to kerosene boiling range hydrocarbons. These commercial technologies include UOP Cat Poly which uses Solid Phosphoric Acid (SPA) catalysts; Axens Polynaphtha that uses amorphous silica-alumina; PetroSA COD technology that uses H-ZSM-5 zeolite; ExxonMobil MOGD or Emogas technology that uses H-ZSM-5 zeolitic, H-ZSM-22 zeolite, or H-ZSM-57.

At least a portion of the oligomerization reactor product (stream 13) is recycled to the LFP separation unit (Unit 4). The oligomerized portion of the stream has a boiling point range that primarily results in the oligomers to be in the medium LFP separation unit product and will then go the hydroisomerization reactor (Unit 5). Alkenes from the oligomerization reactor (Unit 7) are hydrogenated to alkanes in the hydroisomerization reactor.

Figure 3:
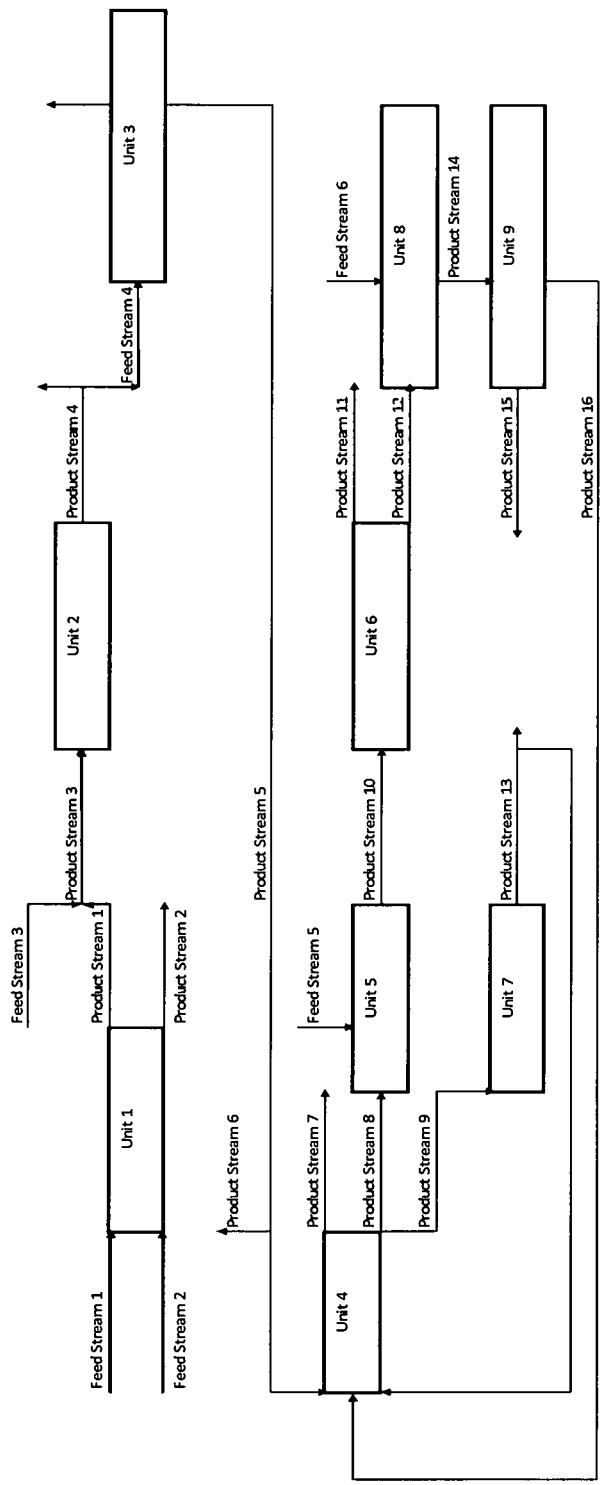
FIG. 3 is a process a to produce synthesized paraffinic kerosene through the use of a hydrocracker reactor.

FIG. 3 shows another optional embodiment of the invention. In this embodiment, the heavy hydroisomerization product (Stream 12) instead of being sold as a diesel fuel is sent to a hydrocracker reactor to increase the kerosene or jet fuel yield. Hydrogen (Feed stream 6) is also added to the hydrocracker reactor. Unlike standard petroleum refining hydrocracker, the hydrocracker is operated at generally lower severity (temperature and pressure) than a petroleum refining unit that is used to convert vacuum gas oil to diesel fuel. This is because the heteroatom level (S, N) in the hydrocracker feedstock is very low, and the feedstock carbon number distribution is in the range of $C_{16}$-$C_{24}$ instead of the $C_{44+}$ that is common in petroleum vacuum gas oil. The operating pressure of the hydrocracker is from 10 to 70 bar and more preferably from 25 to 35 bar. The operating temperature of the reactor is from 250 to 380° C.

Hydrocracking catalysts must have metal and acid sites. Many different catalysts have been investigated for n-alkane hydrocracking in general and for Fischer-Tropsch hydrocracking in particular. Based on the metal functionality, there are two major classes of catalysts that are relevant for the hydrocracking of these materials:

1. Sulfided base metals on acidic support materials. These are typical crude oil hydrocracking catalysts and require the addition of a sulfiding agent to keep the metals in their sulfided state. Such catalysts are industrially applied in some Fischer-Tropsch facilities with syncrudes. The catalysts of this type that have most often used are NiMo and NiW on amorphous silica alumina (ASA).

2. Unsulfided noble metal catalysts. Hydrocracking catalysts based on Pt/SiO2-Al2O3 were found to be very good for this hydrocracking application, and higher distillate selectivities are obtained at high conversion than over sulfided base metal catalysts. However, because of the Pt, the costs of these catalyst are higher.

The hydrocracker reactor is operated at the minimum severity required to convert the $C_{16}$-$C_{24}$ material to a $C_9$-$C_{15}$ fraction. The hydrocracker product stream (Product Stream 14) is sent to the Hydrocracker Product Separation Unit (Unit 9) where the light gases ($H_2$, $C_1$-$C_4$) are flashed off. The heavy hydrocracker product separation unit (Stream 16) that comprises hydrocarbons with carbon numbers from 5 to 15. At least a portion of the Heavy Hydrocracker Product Separation Stream is sent back the LFP Separation Unit (Unit 4).

The SPK jet fuel of the invention is carbon neutral and has a well-to-wheels CO2 emission of between 0 and 10 $gCO_2$ eq/MJ. This emissions factor is known as the carbon intensity. The well-to-wheel emissions include all emissions related to the fuel production, processing, distribution, and use. Tools such as CA-GREET 3.0 (reference 4) can be used to calculate the overall carbon intensity.

Example 1: Hydroisomerization

The LFP reactor produces a LFP hydrocarbon product stream is produced with 50.7 vol % of the hydrocarbon product stream consisting of n-alkanes with carbon numbers from 9 to 15. The LFP separation unit produces a medium LFP separation unit product stream comprising n-alkanes with carbon numbers from 9 to 15.

Per ASTM D7566, the specification for F-T derived SPK has several critical properties. The key parameters are flash point (FLP) and freezing point (FP). The minimum flash point (FLP) is 38° C. and the maximum freezing point (FP) is −40° C. However, typically Jet A fuel used at U.S. airports has a freezing point from −42 to −45° C.

Table 1 shows the composition of the LP hydrocarbon product in the range from $C_9$ to $C_{15}$. The data shows that $C_9$-$C_{15}$ n-alkane fraction of the LFP hydrocarbon product is 50.7 vol % of the total LFP hydrocarbon product. Without any additional processing, the medium LFP separation product does not meet the SPK specifications on freezing point with a freezing point of greater than −17.8° C. The medium LFP separation product does meet the flash point specification with a flash point of greater than 54.4° C.

TABLE 1

LFP liquid product comprising n-alkanes converted to methyl branched alkanes via Hydroisomerization

| Carbon Number | Fraction of Normal-Alkanes in LFP Liquid Product Vol. % | Normal-Alkane Properties | | | Conversion of n-alkanes to methyl branched alkane Properties | | |
|---|---|---|---|---|---|---|---|
| | | FP (° C.) | PP (° C.) | FLP (° C.) | FP (° C.) | PP (° C.) | FLP (° C.) |
| C9 | 9.3 | −51.1 | −48.3 | 36.1 | −80.0 | −77.2 | 36.1 |
| C10 | 8.8 | −27.2 | −24.4 | 52.8 | −76.1 | −73.3 | 47.8 |
| C11 | 8.1 | −26.1 | −23.3 | 65.0 | −48.9 | −46.1 | 50.0 |
| C12 | 7.3 | −10.0 | −7.2 | 81.1 | −47.2 | −43.9 | 80.0 |
| C13 | 6.5 | −5.0 | −2.2 | 102.2 | −45.6 | −42.8 | 71.1 |
| C14 | 5.7 | 2.2 | 4.4 | 116.1 | −44.4 | −41.7 | 80.0 |
| C15 | 5.0 | 10.0 | 12.8 | 132.2 | −47.2 | −43.9 | 89.4 |
| Results | 50.7% of total | >−18 | >−18 | >54 | <−48 | <−45.5 | >46 |

PP: Pour Point;
FP: Freezing Point;
FLP: Flash Point

Additional hydroisomerization of the medium LFP separation unit product is required to meet the SPK specification.

Table 1 shows the properties of methyl branched n-alkanes for carbon numbers from $C_9$ to $C_{15}$. The Freezing Point (FP) is significantly reduced after hydroisomerization to less than −48° C. This meets the SPK specification. The Flash Point (FLP) is decreased slightly but still meets the SPK specification.

The overall composition and properties of the Infinium Jet Fuel are provided in Table 2.

TABLE 2

Composition and Properties of the Infinium Jet Fuel

| Distribution of Iso-Alkanes | Vol. % | FP (° C.) | PP (° C.) | FLP (° C.) | Density (g/ml) (15° C.) | BP(° C.) |
|---|---|---|---|---|---|---|
| C9 | 18.3 | −80 | −77.2 | 36.1 | 0.75 | 143 |
| C10 | 17.4 | −76.1 | −73.3 | 47.8 | 0.75 | 167 |
| C11 | 16.0 | −48.9 | −46.1 | 50 | 0.76 | 211 |
| C12 | 14.4 | −47.2 | −43.9 | 80 | 0.76 | 218 |
| C13 | 12.8 | −45.6 | −42.8 | 71.1 | 0.77 | 227 |
| C14 | 11.2 | −44.4 | −41.7 | 80 | 0.77 | 234 |
| C15 | 9.9 | −47.2 | −43.9 | 89.4 | 0.77 | 262 |
| Average Fuel Properties | | <−48 | <−45.5 | >46 | 0.765 | |

FP: Freeze Point;
PP: Pour Point;
FP: Flash Point;
BP: Boiling Point

The overall properties of the Infinium Synthetic Jet Fuel of this invention relative to the standard jet fuel specifications are given in Table 3 below.

TABLE 3

Infinium Synthetic Jet Fuel Specifications

| Fuel Property | ASTM test # | Fuel Specification Minimum | Fuel Specification Maximum | Infinium Synthetic Jet Fuel |
|---|---|---|---|---|
| Color | D156/6045 | | | Clear |
| Particulate Contaminants (mg/l) | D545 2 | | 1.00 | <0.2 |
| Flash Point (° C.) min. | IP170 | 38 | | >40 |
| Freeze Point (° C.) min. | D2386/IP16 | | −47 | <−48 |
| Density (15° C.) (g/cc) | D4052/IP365 | 0.77 | 0.84 | 0.77 |
| Distillation | | | | |
| T10 (° C.) | D86/IP123 | | 205 | 167 |
| Final Boiling Point (° C.) | D86/IP123 | | 300 | 262 |
| Residue (volume %) | D86/IP123 | | | <0.3 |
| Loss (volume %) | D86/IP123 | | | <0.5 |
| Viscosity (−20° C.) (cStokes) | D455/IP71 | | 8.00 | 3.05 |
| Specific Energy (Btu/lb) [kJ/kg] | D4809 | 18400 [42.8] | | 19000 [44.2] |
| Hydrogen Content (wt. %) | | 13.4 | | 15.5 |
| Smoke Point (mm) | D1322/IP57 | 25 | | >40 |
| Aromatics (vol. %) | D1319/IP156 | 8 | 25 | <0.10 |
| Total Sulfur (ppm) | IP336 | | 3,000 | <5 |
| Mercaptan Sulfur (ppm) | | | 2,000 | <5 |

In some embodiments, the D86 final boiling point of the Infinium Synthetic Jet fuel is between 299° C. and 250° C. In certain cases the D86 final boiling point of the Infinium Synthetic Jet fuel is between 290° C. to 225° C. In certain cases the D86 final boiling point of the Infinium Synthetic Jet fuel is between 285° C. and 235° C. In certain cases the D86 final boiling point of the Infinium Synthetic Jet fuel is between 275° C. and 245° C.

In some embodiments, the density at 15° C. of the Infinium Synthetic Jet fuel is between 0.75 to 0.84 g/cc. In certain cases the density at 15° C. of the Infinium Synthetic Jet fuel is between 0.75 to 0.82 g/cc. In certain cases the density at 15° C. of the Infinium Synthetic Jet fuel is between 0.75 to 0.80 g/cc. In certain cases the density at 15° C. of the Infinium Synthetic Jet fuel is between 0.75 to 0.77 g/cc.

In some embodiments, the smoke point of the Infinium Synthetic Jet fuel is between 40 and 80 mm. In some embodiments, the smoke point of the Infinium Synthetic Jet fuel is between 40 and 75 mm. In some embodiments, the smoke point of the Infinium Synthetic Jet fuel is between 40 and 65 mm.

In some embodiments, the aromatics content of Infinium Synthetic Jet fuel is between 0.1 to 8 vol. %. In some embodiments, the aromatics content of Infinium Synthetic Jet fuel is between 0.1 to 4 vol. %. In some embodiments, the aromatics content of Infinium Synthetic Jet fuel is between 0.1 to 2 vol. %. In some embodiments, the aromatics content of Infinium Synthetic Jet fuel is between 0.1 to 1 vol. %.

Example 2: Oligomerization

The Light LFP Separation Unit product is a mixture of $C_5$ to $C_8$ alkanes and alkenes. The composition in this example is 81.1 wt % $C_5$-$C_8$ n-alkane and 18.9 wt % $C_5$-$C_8$ alkene. The Oligomerization Unit is operated at 100° C., 8 bar, and at an LHSV of 1.2 h$^{-1}$. The catalyst used is sulfated zirconia ($SO_4^{2-}/ZrO_2$). The Oligomerization Reactor product is 81.1 wt % $C_5$-$C_8$ n-alkane, 10.4 wt % $C_9$-$C_{15}$ alkene, 7.6 wt % $C_{16}$-$C_{21}$ alkene, and 0.9 wt % $C_{22+}$ alkene. A portion of the Oligomerization reactor product is recycled to the LFP separation unit.

There are a number of embodiments of the invention including the following but not limited to the listed embodiments.

1. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is $-40°$ C. or lower.

2. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is $-40°$ C. or lower and wherein at least a portion of the light LFP separation unit product stream is fed to an oligomerization reactor to produce an oligomerization reactor product that comprises hydrocarbons with a carbon number from 9 to 15.

3. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is $-40°$ C. or lower and wherein at least a portion of the light LFP separation unit product stream is fed to an oligomerization reactor to produce an oligomerization reactor product that comprises hydrocarbons with a carbon number from 9 to 15 and wherein 4. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is $-40°$ C. or lower and wherein at least a portion of the light LFP separation unit product stream is fed to an oligomerization reactor to produce an oligomerization reactor product that comprises hydrocarbons with a carbon number from 9 to 15 and wherein at least a portion of the heavy LFP separation unit product is fed to a hydrocracker reactor to produce hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15.

5. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower and wherein at least a portion of the light LFP separation unit product stream is fed to an oligomerization reactor to produce an oligomerization reactor product that comprises hydrocarbons with a carbon number from 9 to 15 and wherein at least a portion of the heavy LFP separation unit product is fed to a hydrocracker reactor to produce hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15 and wherein the heavy hydrocracker product stream is fed to the LFP separation unit.

6. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower.

7. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15.

8. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15 wherein at least a portion of the oligomerization reactor product is fed to the LFP separation unit.

9. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15 wherein at least a portion of the heavy LFP separation unit product is fed to a hydrocracker reactor to produce hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15.

10. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15 wherein at least a portion of the heavy LFP separation unit product is fed to a hydrocracker reactor to produce hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15 wherein the heavy hydrocracker product stream is fed to the LFP separation unit.

11. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit where the hydroisomerization unit is a catalytic reactor where the catalyst comprises a precious metal chosen from the group of platinum or palladium and the catalytic hydroisomerization unit produces a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower.

12. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit where the hydroisomerization unit is a catalytic reactor where the catalyst comprises nickel and the catalytic hydroisomerization unit produces a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower.

13. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 65 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit where the hydroisomerization unit is a catalytic reactor where the catalyst comprises copper and the catalytic hydroisomerization unit produces a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower.

14. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower and wherein at least a portion of the light LFP separation unit product stream is fed to an oligomerization reactor, where the oligomerization reactor is a catalytic reactor where the catalyst comprises solid phosphoric acid and the oligomerization reactor produces an oligomerization reactor product that comprises hydrocarbons with a carbon number from 9 to 15.

15. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower and wherein at least a portion of the light LFP separation unit product stream is fed to an oligomerization reactor, where the oligomerization reactor is a catalytic reactor where the catalyst comprises chromium and the oligomerization reactor produces an oligomerization reactor product that comprises hydrocarbons with a carbon number from 9 to 15.

16. A process for the production of synthetic paraffinic kerosene comprising low carbon electricity is used in an electrolyzer to convert an electrolyzer feedstock comprising water to a first electrolyzer product stream comprising hydrogen and a second electrolyzer product stream comprising oxygen; at least a portion of the first electrolyzer product stream comprising hydrogen is mixed with a stream comprising carbon dioxide to produce an RWGS reactor feed stream; the RWGS reactor feed stream is fed to a RWGS reactor to produce a RWGS product stream that comprises hydrogen and carbon monoxide; at least a portion of the RWGS product stream is used as a LFP reactor feed stream; the LFP reactor feed stream is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 40 vol % and 100% of the total hydrocarbon product of in the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower and wherein at least a portion of the light LFP separation unit product stream is fed to an oligomerization reactor, where the oligomerization reactor is a catalytic reactor where the catalyst comprises $SO_4^{2-}$/$ZrO_2$ and the oligomerization reactor produces an oligomerization reactor product that comprises hydrocarbons with a carbon number from 9 to 15.

17. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15 wherein at least a portion of the heavy LFP separation unit product is fed to a hydrocracker reactor where in the hydrocracker is a catalytic reactor where the catalyst comprises sulfided base metal on an acid supported material where the hydrocracker reactor produces a hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15.

18. A process for the production of synthetic paraffinic kerosene comprising a LFP reactor feed stream comprising hydrogen and carbon monoxide is fed to a Liquid Fuel Production reactor to produce an LFP hydrocarbon product stream comprising n-alkanes with carbon numbers from 9 to 15 wherein the fraction of the $C_9$-$C_{15}$ n-alkanes is between 50 volume %, and 100% volume % of the total liquid hydrocarbon product of the LFP hydrocarbon product stream; at least a portion of the LFP hydrocarbon product stream is fed to a LFP separation unit wherein the LFP separation unit produces at least three product streams wherein the light LFP separation unit product comprises n-alkanes with carbon numbers from 5 to 8 and wherein the medium LFP separation unit product stream comprises n-alkanes with carbon numbers from 9 to 15 and wherein the heavy LFP separation unit product comprises n-alkanes with carbon numbers of 16 to 24; at least a portion of the medium LFP separation unit product stream is fed to a catalytic hydroisomerization unit to produce a hydroisomerization product stream that is fed to a hydroisomerization separation unit to produce at least two hydroisomerization products wherein the heavy hydroisomerization product comprises branched chain alkanes with carbon numbers from 9 to 15 and wherein the freeze point of the heavy hydroisomerization product stream is −40° C. or lower. wherein at least a portion of the light LFP separation unit product stream is fed to an oligomerization reactor to produce an oligomerization reactor product that comprises hydrocarbons with a carbon number from 9 to 15 wherein at least a portion of the heavy LFP separation unit product is fed to a hydrocracker reactor where in the hydrocracker is a catalytic reactor where the catalyst comprises unsulfided noble metal where the hydrocracker reactor produces a hydrocracker product stream wherein the hydrocracker product stream is fed to a hydrocracker product separation unit to produce at least two hydrocracker product streams wherein the light hydrocracker product stream comprises hydrogen and wherein the heavy hydrocracker product stream comprises hydrocarbons with carbon numbers from 9 to 15.

REFERENCES

1. ASTM D7566-21 is the relevant standard for Jet fuel "Standard Specification for Aviation Turbine Fuel Containing Synthesized Hydrocarbons—specifically Annex 1 that deals with the specification for synthetic paraffinic kerosene (SPK) produced by Fischer-Tropsch reactions. Specification issued on Jul. 1, 2021.
2. Arno de Klerk, "Aviation Turbine Fuels Through the Fischer-Tropsch Process", Chapter 10 in *Biofuels for Aviation*. 2016 Elsevier Inc. DOI: http://dx.doi.org/10.1016/B978-O-12-804568-8.00010-X
3. Andreas Meurer and Jurgen Kern, "Fischer-Tropsch Synthesis as the Key for Decentralized Sustainable Kerosene Production", Energies 2021, 14, 1836. https://doi.org/10.3390/en14071836, https://www.mdpi.com/journal/energies

The invention claimed is:
1. A process for the production of synthetic paraffinic kerosene comprising:
  a. using low carbon electricity in an electrolyzer to convert an electrolyzer feedstock comprising water to a first electrolyzer product stream comprising hydrogen and a second electrolyzer product stream comprising oxygen;
  b. mixing at least a portion of the first electrolyzer product stream with carbon dioxide to produce an RWGS reactor feed stream;
  c. feeding the RWGS reactor feed stream to an RWGS reactor to produce an RWGS product stream comprising hydrogen and carbon monoxide;
  d. feeding at least a portion of the RWGS product stream to an LFP reactor to produce an LFP hydrocarbon product stream comprising $C_9$-$C_{15}$ n-alkanes and alkenes, wherein the $C_9$-$C_{15}$ n-alkanes and alkenes comprise between 40 volume percent and 99 volume percent of the LFP hydrocarbon product stream;
  f. feeding at least a portion of the $C_9$-$C_{15}$ n-alkane stream is fed to a catalytic hydroisomerization unit to produce a hydroisomerization product stream that is fed to a hydroisomerization separation unit to produce at least two hydroisomerization products wherein at least one of the hydroisomerization products streams meets ASTM D7566-21.
2. A process for the production of synthetic paraffinic kerosene comprising:
  a. using low carbon electricity in an electrolyzer to convert an electrolyzer feedstock comprising water to a first electrolyzer product stream comprising hydrogen and a second electrolyzer product stream comprising oxygen;
  b. mixing at least a portion of the first electrolyzer product stream with carbon dioxide to produce an RWGS reactor feed stream;
  c. feeding the RWGS reactor feed stream to an RWGS reactor to produce an RWGS product stream comprising hydrogen and carbon monoxide;
  d. feeding at least a portion of the RWGS product stream to an LFP reactor to produce an LFP hydrocarbon product stream comprising $C_5$-$C_{24}$ n-alkanes and alkenes, wherein the $C_5$-$C_{24}$ n-alkanes and alkenes comprise between 40 volume percent and 99 volume percent of the LFP hydrocarbon product stream;
  e. feeding at least a portion of the LFP hydrocarbon product stream to a LFP separation unit, wherein the LFP hydrocarbon product stream is separated into at least three LFP separation products, a light LFP separation product comprising $C_5$-$C_8$ n-alkanes and alkenes, a medium LFP separation product comprising $C_9$-$C_{15}$ n-alkanes, and a heavy LFP separation product comprising $C_{16}$-$C_{24}$ n-alkanes;
  f. feeding at least a portion of the medium LFP separation product to a hydroisomerization reactor and mixing it with a hydrogen stream to produce a hydroisomerization product stream, wherein the hydroisomerization reactor comprises a hydroisomerization catalyst;
  g. feeding the hydroisomerization product stream to a hydroisomerization separation unit to produce at least two separated hydroisomerization produces, a light hydroisomerization product and a heavy hydroisomerization product, wherein the heavy hydroisomerization product comprises $C_9$-$C_{15}$ branched chain alkanes having a freeze point ranging from −48° C. to −55° C. thereby producing synthetic paraffinic kerosene.
3. The process of claim 2, wherein the light LFP separation product is fed into an oligomerization reactor, wherein the oligomerization reactor comprises a catalyst, and wherein the oligomerization reactor converts the alkenes to an oligomer stream, and wherein at least a portion of the oligomer stream is recycled to the LFP separation unit.
4. The process of claim 2, wherein at least a portion of the heavy LFP separation product is fed to a hydrocracker reactor to produce a hydrocracker product stream, wherein the hydrocracker reactor comprises a catalyst, and wherein the hydrocracker product stream is fed to a hydrocracker separation unit, producing at least two hydrocracker product streams, a light hydrocracker stream and a heavy hydrocracker product stream, and wherein the light hydrocracker product stream comprises hydrogen, and wherein the heavy hydrocracker stream comprises $C_9$-$C_{15}$ hydrocarbons.

5. The process of claim 2, wherein the hydroisomerization catalyst is a solid-shaped particle comprising a metal deposited on an acidic support.

6. The process of claim 2, wherein the $C_9$-$C_{15}$ branched chain alkanes have: a carbon intensity (CI) ranging from 0 to 10 g$CO_2$ eq/MJ; a final boiling point by D86 of ranging from 299° C. to 250° C.; a density ranging from 0.75 to 0.84 g/cc; a smoke point ranging from 40 mm to 60 mm; an aromatics content ranging from 7 to 0.01 volume percent.

7. The process of claim 3, wherein the oligomerization reactor catalyst is selected from a group of catalysts consisting of: $SO_4^{2-}$/$ZrO_2$, H-ZSM-5, H—Y, Cr/H-ZSM-5, Cr/H—Y, Cr/H-MCM-41, Solid Phosphoric Acid (SPA), metal promoted Solid Phosphoric Acid, Fe/NiO/SPA, amorphous $SiO_2$—$Al_2O_3$, H-ZSM-22, H-ZSM-57, Cr/$SO_2$, $H_3PO_4$/$SO_2$.

8. The process of claim 4, wherein the hydrocracker reactor catalyst is selected from a group of catalysts consisting of: sulfided base metals on acidic support materials; unsulfided noble metal catalysts.

9. The process of claim 4, wherein at least a portion of the heavy hydrocracker product stream is recycled to the LFP separation unit.

10. The process of claim 5, wherein the hydroisomerization catalyst metal is selected from a group of metals consisting of: platinum, palladium, nickel, copper, Ni—Cu, Ni—Mo, Pt—Fe and Pt—Be.

11. The process of claim 10, wherein the acidic support is selected from a group of acidic supports consisting of: ZSM-5, ZSM-22, ZSM-23, silica, alumina, $SiO_2$—$Al_2O_3$, beta zeolite, MCM-41, MCM-48, SBA-15 and blends of the listed supports.

* * * * *